United States Patent

[11] 3,630,722

[72] Inventor Frank D. Chew
4320 North 63rd Ave., Phoenix, Ariz. 85033
[21] Appl. No. 865,672
[22] Filed Oct. 13, 1969
[45] Patented Dec. 28, 1971

[54] COPPER-REFINING PROCESS
1 Claim, 1 Drawing Fig.

[52] U.S. Cl..................................................... 75/76, 75/101, 75/109, 75/117
[51] Int. Cl....................................................... C22b 15/08, C22b 15/12, C22b 15/14
[50] Field of Search............................................ 75/76, 101, 109, 117

[56] References Cited
UNITED STATES PATENTS

| | | | |
|---|---|---|---|
| 3,186,833 | 6/1965 | Cech | 75/72 |
| 3,212,883 | 10/1965 | Cech | 75/72 |
| 3,258,330 | 6/1966 | Ito | 75/76 X |
| 3,282,675 | 11/1966 | Parker | 75/.5 A |
| 3,282,680 | 11/1966 | Dore | 75/76 |
| 3,544,306 | 12/1970 | McGauley | 75/72 |

Primary Examiner—L. Dewayne Rutledge
Assistant Examiner—Joseph E. Legru
Attorney—Drummond, Cahill & Phillips ABSTRACT: In an integrated process, copper-bearing materials are leached with dilute sulfuric acid and the dilute pregnant leach solution is reacted with ferrous scrap to produce cement copper precipitate containing copper metal, ferrous impurities and normally refractory metal impurities. The raw cement copper is preliminarily treated to separate portions of the ferrous impurities and is then melted and reacted with chlorine under a metal halide flux cover. The chlorine selectively reacts with the refractory metals and the ferrous impurities, forming chlorides which are dissolved by the halide flux to produce a slag containing entrained copper metal, copper chloride and the impurity metal chlorides. After separation of the substantially pure copper metal remaining in the melt, the readily friable slag is cooled to solidification and crushed. Entrained copper metal particles are removed from the crushed slag by screening and recycled to the chlorine refining step. The remainder of the slag is leached with water to dissolve the copper chloride and the pregnant copper chloride solution is recycled to the cementation step to recover the copper values.

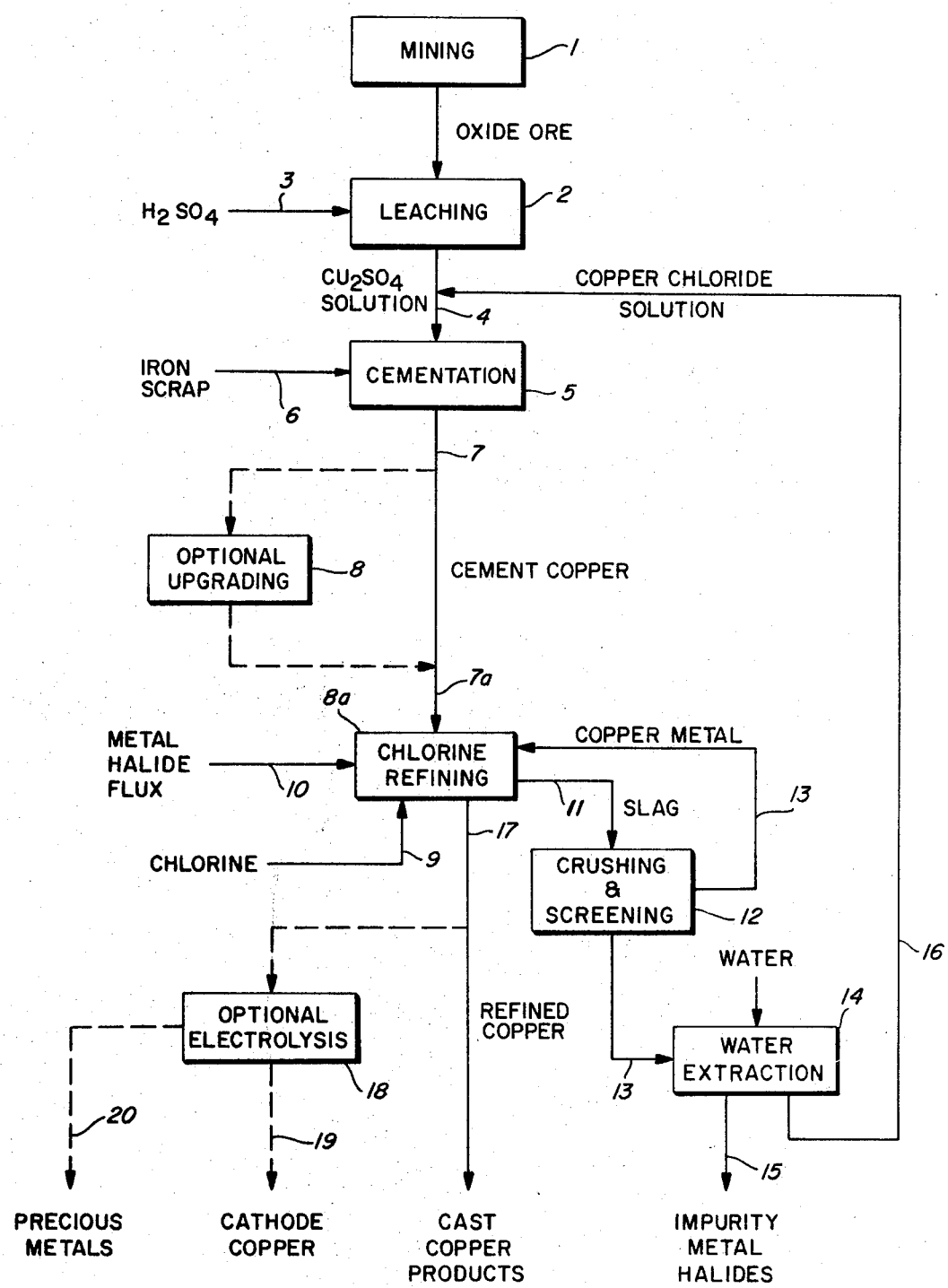

COPPER-REFINING PROCESS

This invention relates to copper-refining processes.

More particularly, the invention concerns an integrated process for recovering copper values from materials in which said values are associated with impurities which are normally refractory in conventional pyrometallurgical smelting processes.

In a particular aspect, the invention concerns a process for recovering copper values from complex ores containing impurities such as selenium, tellurium, bismuth, lead, antimony, arsenic, zinc, and the like, and compounds thereof, which were formerly extremely difficult to separate from copper by conventional smelting techniques.

In still another respect, the invention relates to a process which may be efficient and conveniently utilized in small-scale copper-refining operations in which expensive reverberatory furnaces, converters and fire-refining furnaces normally employed in modern smelting plants are unnecessary.

In a further and more particular aspect, the invention relates to a copper-refining process in which selective chlorination of impurities separates them from the valuable copper metal and in which the impurity chlorides and entrained copper metal are treated to recover the copper values by simple mechanical and aqueous leaching steps, after which copper values are recycled to the appropriate prior steps for recovery.

In an even more particular aspect, the invention relates to a process specifically adapted to upgrading raw cement copper to valuable finished products substantially free of troublesome metal impurities normally associated with cement copper precipitates.

Further, in one specific respect, the invention deals with a novel pyrometallurgical refining process for converting copper oxide ores or mixed copper oxide—copper sulfide ores to finished copper products.

According to conventional modern practice, copper is produced by selectively mining low-grade copper sulfide ores usually containing less than 1 percent copper. The ore, according to conventional practice, is then milled to an extremely small particle size and subjected to various beneficiation procedures which usually include a flotation step in which the copper sulfide ore particles are physically separated from associated rock materials to produce a so-called "ore concentrate" usually containing about 30 percent copper. The ore concentrate is then fed continuously into a reverberatory smelting furnace in which it is melted, forming separate layers of reverberatory slag, which is discarded, and reverberatory furnace "matte," the valuable fraction comprising an artificial iron sulfide—copper sulfide mixture.

The reverberatory matte is Bessemerized in a horizontal converter by blowing thin streams of air through the molten matte. During a first stage of converter operation, the air blown through the matte oxidizes the iron sulfide, yielding a sulfur dioxide gas and iron oxide. The iron oxide reacts with a siliceous flux in the converter, forming a silicate slag which is decanted from the converter, leaving substantially pure copper sulfide or "white metal" in the converter. During the second stage of converter operation, air is blown through the white metal and the sulfur associated with the copper is burned, forming additional quantities of sulfur dioxide, leaving fairly pure "blister" copper in the converter.

The blister copper product of the converter contains some sulfur, some iron, and usually contains trace quantities of other metallic impurities such as selenium, tellurium, bismuth, lead, antimony, arsenic, zinc, and the like.

The molten blister copper from the converter is usually transferred to a so-called fire-refining furnace where air is blown through the blister copper under carefully controlled conditions, usually at lower temperatures, to remove the last traces of sulfur and iron impurities. In conventional practice, the impurity metals associated with the blister copper are very difficult to remove in the converting or fire-refining steps and special techniques involving additional flux materials such as soda ash, lime, charcoal, etc., are employed in an attempt to reduce the level of such impurities to an acceptably low value. These trace impurities are especially troublesome in that they adversely affect the casting characteristics of the copper, its ductility and, particularly in the case of selenium, its electrical properties.

Further and more detailed descriptions of conventional prior art pyrometallurgical smelting processes are found in *Copper, The Metal, Its Alloys and Compounds*, by Allison Butts, (ACS Monograph Series, Reinhold, 1954), pages 72 et seq.

The above-described conventional pyrometallurgical smelting practices for obtaining copper from its sulfide ores are fairly well suited in the treatment of most normal mine-run ores. However, the composition of copper sulfide ores may vary widely between various localities and, on some occasions, may vary widely within the same ore body. For example, in the operation of the Kennecott mine known as the Santa Rita pit in Hurley, N.M., operations were seriously hampered in the late 1940's and early 1950's due to the fact that normal mining operations had uncovered a localized body of ore of unusually high selenium content and it was necessary to make drastic adjustments in the fire-refining practice at the Hurley smelter in order to remove the selenium from the copper to an acceptably low level.

In addition to the problems caused by metal impurities associated with copper ores which are refractory in the conventional smelting and fire-refining practice, a serious problem has existed in the past in connection with the operation of small mines not directly connected with a conventional smelting operation. The quantities of ores and concentrates which could be produced from such small mines was insufficient to justify the capital expenditure necessary to erect a smelting plant. For example, the cost of a single converter and its accessory equipment generally exceeds $2,000,000. Consequently, the operators of such mines were forced to ship their ores or concentrates for considerable distances to custom smelting plants.

Various expedients have been proposed to alleviate the problems of the small mine operators. For example, various hydrometallurgical processes have been developed, the object of which was to directly convert copper ores and concentrates without relatively expensive pyrometallurgical apparatus to valuable copper products. Illustratively, a process involving acid leaching of copper ores and direct hydrogen reduction of the pregnant leach liquor has been recently utilized by Arizona Chemcopper Company at Bagdad, Ariz., and is reported in the Aug. 29, 1966, issue of "Chemical Engineering" at pages 64–66. More recently, direct electrolysis of pregnant acid leach liquor has been utilized for the direct production of cathode copper. Serious difficulties were encountered in the acid leach-hydrogenation process mentioned above and even the electrolysis route is characterized by high initial capital investment.

The problems discussed above are compounded when the ore body contains significant quantities of copper oxide ores for such ores cannot be converted to copper products by customary smelting techniques. When copper oxide ores are encountered, the operator is remitted to the use of a leaching operation to recover the copper values or, as more recently practiced in Africa, to a direct reduction process of the oxide ore by briquetting the ore with carbon or carbon-producing compounds, which briquets are then introduced into a fuel-fired reduction furnace.

As an alternative to electrolysis or direct hydrogen reduction of a dilute copper leach liquor, many small mine operators produce a material called cement copper or copper precipitate. Cement copper is generally produced by contacting the dilute copper-bearing leach liquors with shredded ferrous scrap, usually detinned cans, in which operation the iron replaces the copper in solution and the copper values are precipitated, forming a mudlike slurry of small dendritic copper particles. Typical cement copper precipitates contain upwards of 60–80 percent copper metal and are heavily contaminated with trace metal impurities such as those described above which may be derived from the ore body or which may be introduced into the cement copper at the cementation stage because of metallic coatings or alloying materials associated with the iron scrap.

In addition to the trace metal impurities, the cement copper is usually heavily contaminated with particles of iron derived from the ferrous scrap and usually contains significant amounts of organic residues. Therefore, as conventionally produced, cement copper is so heavily loaded with troublesome impurities as to render it unfit for direct conversion to valuable copper products and the conventional expedient is to merely dump the raw cement copper into either the reverberatory furnace or the converter in a typical copper-smelting plant.

In view of the problems described above, it would be highly advantageous to provide a copper-refining process adapted to conveniently and economically refine copper ores containing impurities which are refractory in conventional pyrometallurgical smelting processes. In addition, it would be highly beneficial to provide a process specially suited, because of low capital investment requirements, for onsite treatment of ores from small mines which cannot economically justify the expenditure necessary for equipment used in conventional pyrometallurgical smelting processes. Furthermore, a copper-refining process adapted to refine small quantities of highly contaminated raw cement copper and in which the technical difficulties associated with prior attempts to achieve this end are obviated would be particularly advantageous.

It is therefore an object of the present invention to provide a novel copper-refining process.

Another object of the invention is to provide a copper-refining process especially suited to the treatment of copper-bearing materials containing trace metal impurities which are refractory in conventional pyrometallurgical smelting processes.

Yet another object of the invention is to provide a copper-refining process in which the equipment employed is relatively inexpensive and which, therefore, can be economically practiced onsite at relatively small mining operations.

Still another object of the invention is the provision of a copper-refining process which, in combination with conventional leaching technology, is adapted to the winning of copper from its oxide ores without electrolytic or high-pressure hydrometallurgical unit operations.

These and other, further, and more specific objectives of the invention and the operating advantages attained by its use will become apparent to those skilled in the art from the following description thereof and the accompanying drawings in which a preferred embodiment of the invention is illustrated and described. The various features of novelty which characterize the present invention are pointed out with particularity in the claims annexed to and forming a part of this specification.

The drawing illustrates a process embodying the various features of the invention.

Briefly, I provide an integrated process for preparing copper products from acid-leachable materials containing copper values, particularly materials containing metallic impurities associated with the copper which are normally refractory in conventional prior art pyrometallurgical smelting processes. My process comprises a combination of steps of leaching the copper-bearing materials with dilute sulfuric acid to produce a dilute pregnant solution of copper and impurity metal sulfates; contacting the pregnant solution with ferrous scrap in a cementation zone to produce a raw cement copper product; separating portions of the ferrous impurities from the raw cement copper to produce a cement copper concentrate; melting the concentrate in a refining zone; introducing chlorine into the melt in sufficient quantity to convert the impurities and a minor portion of the copper to the corresponding respective metal chlorides; simultaneously with the introduction of chlorine into the melt contacting the melt with a metal halide flux which is liquid but below its boiling point at the temperature of the melt, thereby forming a liquid slag on the melt which includes entrained copper metal, copper chloride and the impurity metal chlorides; separating the substantially pure copper metal from the slag; cooling the slag to below its melting temperature; mechanically separating the entrained copper metal from the friable cooled slag and recycling the entrained copper to the refining zone; leaching the remainder of the cooled slag with water to dissolve the copper chloride in the slag, thus producing a pregnant aqueous solution of copper chloride; and recycling the pregnant solution to the cementation zone.

The process herein described is useful in recovering copper from a wide variety of acid-leachable materials such as sulfide and oxide ores of copper as well as various scrap materials containing substantial percentages of copper. Although the process may be employed to recover copper from any starting materials which can be leached with acid to produce a dilute copper sulfate solution, particular reference will be made in the following description to the preparation of copper products from copper oxide ores as such process serves as a convenient basis for illustration and also constitutes a presently preferred embodiment of the invention. As will be understood by those skilled in the art, copper oxide ores are usually complex mixtures of various minerals containing copper values in combined form, for example, kroehnkite, atacamite, brochantite, lindgrenite, and chalcanthite. The so-called oxide ores may also contain various copper sulfide minerals and usually will contain various other impurity metals, particularly iron in the form of pyrites or iron oxide minerals. Depending upon the location of the deposit, oxide ores may, and usually do, contain other impurity metals such as selenium, tellurium, bismuth, lead, antimony, arsenic, zinc, and the like, usually in combined form. When such ores are subjected to conventional sulfuric acid leaching, the resulting pregnant solution contains copper and the other impurity metals in the form of their respective sulfate compounds.

The techniques for sulfuric acid leaching of copper ores are well known to those skilled in the art and, in the interest of brevity, will not be described in great detail in this specification. Generally, the leaching step involves percolating a dilute aqueous sulfuric acid solution containing, for example, from about 10–100 g./liter $H_2SO_4$ through the ore, or, alternatively, the ore may be contacted with the dilute acid solution in agitated tanks or other suitable vessels. The pregnant liquor is separated from the leached ore by decantation, filtration, or the like, and depending on the efficiency of contact, the remaining solids may be repulped several times with additional sulfuric acid leach liquid and the pregnant effluent liquors from each leach stage combined for further treatment. As the efficiency of precipitation of the copper values from the pregnant liquor may fall substantially short of 100 percent, it is common practice to recycle the impoverished liquor with additions of makeup acid for reuse in the leaching step. For example, the pregnant liquor feed to the cementation step may contain upwards of 50 g./liter copper and the spent impoverished liquor recycled to the leaching step may contain approximately 10 g./liter copper.

Additional details of conventional leaching practice which may be usefully employed in the practice of my invention are contained in Butts, *Copper, The Metal, Its Alloys and Compounds* (ACS Monograph Series, Reinhold, 1954), pages 300 et seq.

The techniques employed in the cementation step of my process follow conventional art-recognized techniques for the precipitation of copper from dilute copper sulfate solutions to form so-called cement copper. Again, since such techniques are well known in the art, no detailed description of the cementation step will be presented in this specification. Generally, cement copper is prepared by contacting dilute copper sulfate solutions with metallic iron, usually having a relatively high surface area such as detinned cans, machine shop turnings, etc. The copper precipitates from solution as metallic copper contaminated with substantial quantities of residual iron, organic material and impurity metals coprecipitated with the copper. For example, such techniques are described in the patent to Keyes, U.S. Pat. No. 1,971,416, and in the patent to Parker, U.S. Pat. No. 3,282,675.

As will be further described below, dilute copper chloride solutions obtained from a water extraction of the slag produced in my process is recycled to the cementation step where it is combined with the pregnant copper sulfate leach liquor to improve the overall efficiency of the recovery of copper according to my process.

If the conditions of treatment during the cementation step are carefully controlled, it is possible to produce a cement copper of relatively high purity containing greatly reduced quantities of organic material and occluded iron particles. However, in most instances, the efficiency of my process can be significantly improved by treating the raw cement copper in a preliminary step to remove substantial quantities of the occluded iron impurities as well as most of the organic impurities. This optional upgrading of the cement copper can vary from a simple magnetic separation of the elemental iron impurities or, if further improvement of the grade of the cement copper is desired, the optional upgrading may include acid washing and/or flotation steps analogous to those described in the patent to Parker, U.S. Pat. No. 3,282,675.

The cement copper, after the optional upgrading steps, if such are employed (referred to hereafter as a cement copper concentrate), is then introduced into a suitable fuel-fired furnace equipped with a graphite or other refractory crucible for containing the molten impure copper. After the required charge of molten impure copper is built up, chlorine gas is injected into the melt and reacted with the impure copper. The apparatus for carrying out the chlorine treatment is not highly critical and, for example, may be constructed in accordance with the disclosure of the Smith patent, U.S. Pat. No. 2,447,672, which describes a furnace and chlorine injection apparatus used in the chlorine refining of aluminum-base alloys.

Injection of chlorine into the impure molten copper in accordance with my invention selectively converts the normally refractory metal impurities and ferrous impurities to their respective metal chlorides. In the early stages, the reactions are practically stoichiometric but in order to reduce the impurity content of the copper to acceptably low levels, it is generally necessary to drive the chlorination reaction to the right by injecting quantities of chlorine into the molten metal during the later stages of the refining operation which are greatly in excess of stoichiometric. In the latter stages of the refining step, some of the copper is converted to copper chloride due to the stoichiometric excess of chlorine employed.

Before commencing the introduction of chlorine into the molten impure copper, I introduce a metal halide flux into the refining furnace for the purpose of forming a liquid metal halide cover over the molten copper. The liquid metal halide flux cover serves to dissolve the various metal chlorides and the copper chlorides and prevents vaporization of the chlorides during the refining operation. The metal halide flux employed in the practice of my invention may be any metal halide or mixture thereof which is molten at the temperature of the copper melt (i.e., approximately 2,000°–2150° F). In order to prevent vaporization of the halide flux and the dissolved impurity metal halides, I use a halide flux which has a boiling temperature at atmospheric pressure substantially above the temperature of the copper melt. As will be apparent to those skilled in the art, the flux material must be a metal halide which is not reduced or otherwise decomposed by the processing conditions in the chlorine refining furnace to avoid recontamination of the molten copper. As illustrative examples of the metal halide flux which can be employed in the practice of my invention, I may mention the halide salts of magnesium, sodium and calcium, and various naturally occurring complex metal halides such as fluorspar, cryolite, etc. In a presently preferred embodiment of the invention, I employ magnesium melting furnace slags which are mixtures of magnesium, sodium and calcium chloride, and in another preferred embodiment, I employ so-called "old bath" slags from aluminum production potlines which are complex sodium-aluminum-fluoride materials.

The slag produced in the chlorine-refining step of my process contains sufficient copper values to make it economically feasible and desirable to treat the slag specially to recover such values. After the chlorine-refining step is completed, the molten slag is tapped into cooling pits and allowed to cool until the slag solidifies. The solidified slag is then crushed and screened to separate the entrained copper metal granules from the metal halide fines. The copper metal granules are recycled to the chlorine-refining furnace and the fines are extracted with water to dissolve the copper chloride, forming a dilute pregnant copper chloride solution which is recycled to the cementation step as explained above. The undissolved impurity metal halides can be discarded. In some cases, when refining copper ores containing unusually high percentages of valuable trace metal impurities, the slag may be treated to recover the valuable metals therefrom.

After completion of the chlorine refining, the refined copper is subcanted from beneath the metal halide slag and is cast into a wide variety of useful shapes adapted for fabrication into end-use products. For example, the impurity level of my refined copper is such that it is especially suited for use in copper wire products and, in preparation for such use, is cast into wire bars. If the precious metal content of the ores treated by my process is sufficiently high, the refined copper produced by my process may be cast into anodes and subsequently refined in an electrolysis step to separate and recover the precious metals such as gold and silver and to yield cathode copper.

To further illustrate and exemplify the presently preferred practice of my invention, reference may be had to the accompanying drawing which is a flow sheet describing the use of my process to convert mine-run oxide ore to various valuable copper products and byproducts. The ore obtained from a mining operation 1 is transferred to a leaching plant 2 where it is contacted with a sulfuric acid leach liquid 3 to produce a pregnant copper sulfate leach liquor solution 4. The pregnant solution 4 is introduced into cementation tanks 5 where it is contacted with iron or steel scrap 6 to produce cement copper 7. The cement copper may be optionally upgraded 8 by techniques such as mechanical and magnetic separation of iron particles as well as chemical beneficiation procedures such as acid washing and/or flotation to produce a cement copper concentrate 7a.

The cement copper 7 or the cement copper concentrate 7a is introduced into the chlorine-refining furnace 8 where it is melted and reacted with chlorine gas 9 under a metal halide flux 10. After completion of the chlorine refining, the slag 11 is cooled and then subjected to a crushing and screening operation 12. The oversized copper metal granules 13 from the screening step are recycled to the chlorine refining step 8a. The undersized slag fines 13 are extracted with water 14 to dissolve copper chloride therefrom. The impurity metal halides 15 may be discarded or treated further to recover valuable trace impurity metals and the pregnant copper chloride solution 16 from the extraction step is recycled to the cementation step 5. The refined copper product from the chlorine refining step 17 may be directly cast into wire bars or other useful shapes or, optionally, if the precious metal content is sufficiently high, the refined copper 17 may be cast into anodes and subjected to electrolysis 18 to produce cathode copper 19 and to recover the precious metals 20.

The following nonlimiting example is presented in order to further illustrate and describe to those skilled in the art the presently preferred practice of one embodiment of my invention.

EXAMPLE

A copper oxide ore consisting mainly of antlerite and containing minor quantities of kroehnkite, atacamite, brochantite, lindgrenite and chalcanthite is selectively mined and crushed to —three-eighths inch. The crushed ore is introduced into an agitated concrete leaching tank and contacted with 80–90 g./liter sulfuric acid leach liquid at a liquid-to-ore ration of 10,000 gallons of leach liquid per ton of crushed ore. After 4 hours, 6,000 gals./ton of strong pregnant liquor is withdrawn from the leach tank and the solids and remaining leach liquor are repulped with an additional 6,000 gals./ton of fresh leach liquor. This process is repeated two more times to produce three strong solutions of approximately 40, 30 and 15 g./liter copper, respectively. After withdrawal of the third quantity of strong pregnant liquor, the remaining ore solids are repulped five times with 3,000 gals./ton of wash water and the wash waters and strong pregnant liquors are combined to form a blended pregnant leach liquor.

A raw cement copper product is prepared by reacting the pregnant leach liquor with shredded scrap steel in a cementation tank to produce precipitated cement copper containing (weight percent dry basis) 80 percent copper, 5 percent iron, 3 percent insolubles and 12 percent miscellaneous impurities, mainly copper oxides, and including 0.035 lead, 0.008 bismuth and 0.04 percent selenium.

The raw cement copper is screened through a 65-mesh screen and a sufficient quantity of the undersized material to yield a 20 percent solids slurry is agitated for approximately 30 minutes with dilute sulfuric acid (200 g./liter). Thereafter, the liquid is decanted and the cement copper is washed with water to remove residual acid and analyzes (dry basis) 96 percent Cu.

The washed cement copper is then subjected to basic flotation by reslurrying to 10 percent pulp density and maintaining the pH of the flotation mixture above 7 by the addition of caustic soda which also acts as a depressant for copper. The promoters are fuel oil, "R-825" and pine oil at 3.0 pounds of each per ton of cement copper. The cement copper concentrate is recovered as the "tails" from the flotation mixture, substantially all of the carbonaceous materials being separated as the float.

Following the basic float, the copper is floated in an acid circuit at a pH below 2, using two cleaning steps. Sulfuric acid is added for pH control and as a silica depressant. "Minirec A" and "Dowfroth 250" are used as promoter and frother, respectively, in amounts of 3.0 pounds of each per ton of cement copper. The pulp density is maintained at about 5 percent solids.

Following the acid float, the cement copper concentrate is washed with dilute sulfuric acid (20 g./liter) and three water washes to remove substantially all excess flotation reagents. The final cement copper concentrate analyzes approximately 98 percent Cu, 1 percent iron and includes substantially all of the lead, bismuth and selenium impurities.

Instead of the complex acid wash flotation procedures for the preliminary purification of the cement copper, if iron residues are suitably low and if the cement copper is not unduly contaminated with organic or siliceous impurities, simple mechanical screening and magnetic separation of the iron impurities will usually suffice to prepare a cement copper concentrate of approximately 85–90 percent purity, which is successfully employed in the practice of the invention.

The following description illustrates the practice of the remaining steps of my invention to refine the output of a small mining and leaching operation yielding approximately 10–40 tons per day of cement copper. The cement copper concentrate is charged in 10-ton batches into a 4 foot × 6 foot reverberatory-type refining furnace constructed of refractory brick and provided with a rammed magnetite crucible. The furnace is fired with natural gas to melt the concentrate and to maintain it at a temperature of approximately 2,100° F. Liquid chlorine is piped directly from a tank car to a tube-shell vaporizer and thence from the vaporizer through a graphite tube which injects the vaporized chlorine into the melt at a rate of 1 ton per hour. Before beginning the chlorine feed to the refining furnace, 600 lbs. of crushed "old bath" slag from aluminum potline production consisting essentially of a sodium-aluminum-fluoride mixture having the empirical formula $Na_3AlF_6$ is introduced into the refining furnace, spread upon the molten copper and melted, forming a liquid flux cover.

Chlorine injection into the melt is continued and after 1 hour, spectroscopic samples are removed from the furnace at 30-minute intervals, cast into plates and checked with a visual spectroscope. At the end of 2 hours from the beginning of the chlorine introduction, the impurity levels, as determined by the spectroscopic examination of these samples, have fallen to acceptably low levels, at which time the introduction of chlorine is terminated and the molten copper is tapped from the furnace from beneath the liquid slag cover. Analysis of the refined copper reveals the following impurities:

TABLE

| Impurity | % By Wt. |
| --- | --- |
| Iron | 0.0040 |
| Selenium | 0.0002 |
| Lead | 0.0005 |
| Bismuth | 0.0002 |

During the chlorine refining operation, approximately 1 percent of the initial copper charge is converted to cupric chloride and approximately one-half percent of the original copper charge is entrained as copper metal in the slag. The slag, containing the entrained copper metal and the cupric chloride, is tapped from the chlorine refining furnace, cooled to a friable condition and crushed to −100 mesh. The crushed slag is screened over a 65-mesh screen and the oversize, consisting essentially of metallic copper granules, is recycled and introduced into the chlorine-refining furnace. The undersize from the screening operation is intimately contacted in an agitated leach tank with 1,100 gallons of water which extracts substantially all of the soluble cupric chlorine, producing a pregnant cupric chloride solution which is recycled to the cementation tanks to recover copper values therefrom.

The refined copper product tapped from the chlorine-refining furnace is cast into wire bars and meets the industry impurity specifications for wire bar copper.

Various changes in the precise techniques and conditions described above will readily occur to persons skilled in the art having regard for my disclosure. To the extent that such changes and modifications do not depart from the spirit and substance of my invention, they are intended to be included within the scope thereof which is not limited by the foregoing description but only by a just interpretation of the following claim.

What is claimed is:

1. An integrated process for preparing copper products from acid-leachable materials containing copper values and normally refractory metal impurities associated therewith, comprising in combination the steps of:
   a. leaching said acid-leachable materials with dilute sulfuric acid to produce a pregnant solution of copper and impurity metal sulfates;
   b. contacting said pregnant solution with ferrous scrap in a cementation zone to produce a raw cement copper product containing copper metal, ferrous impurities and said normally refractory metals and compounds thereof;
   c. separating portions of said ferrous impurities from said raw cement copper to produce a cement copper concentrate;
   d. forming a melt of said cement copper concentrate in a refining zone;

e. introducing chlorine into said melt in said refining zone in sufficient quantity to convert
substantially all of said refractory impurities,
the balance of said ferrous impurities in said concentrate, and
a minor portion of copper in said melt to the corresponding respective metal chlorides, thereby forming a reaction mixture including
copper metal,
copper chloride, and
impurity metal chlorides;

f. simultaneously with the introduction of said chlorine into said melt contacting said reaction mixture with a flux consisting essentially of a metal halide which is liquid at the temperature of said reaction mixture melt and which has a boiling point substantially above said temperature to dissolve said copper and impurity metal halides from said reaction mixture melt and prevent substantial vaporization thereof, thereby forming a liquid slag on said melt, said slag including
entrained copper metal,
copper chloride, and
impurity metal chlorides;

g. separating the substantially pure copper metal remaining in said melt from said slag;

h. cooling said slag to below its melting temperature;

i. mechanically separating the entrained copper metal from said cooled slag and recycling said copper metal to said refining zone;

j. leaching the remainder of said cooled slag with water after the mechanical separation of said copper metal therefrom to dissolve said copper chloride from said residue to produce a pregnant aqueous solution of copper chloride; and k. recycling said pregnant solution to said cementation zone.

* * * * *